Aug. 2, 1966
M. C. LAYLAND
3,264,594
ADJUSTABLE POTENTIOMETER
Filed Nov. 29, 1962
2 Sheets-Sheet 2
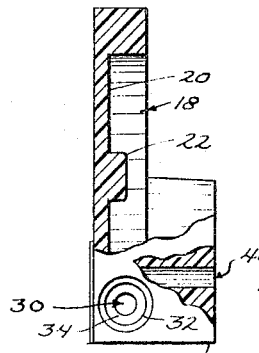
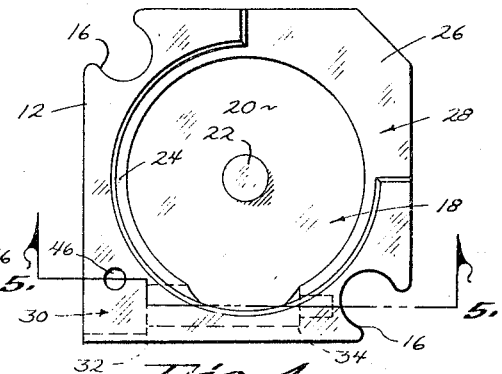
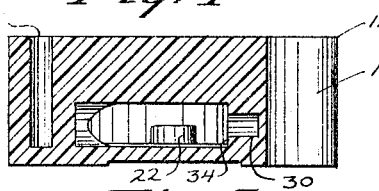
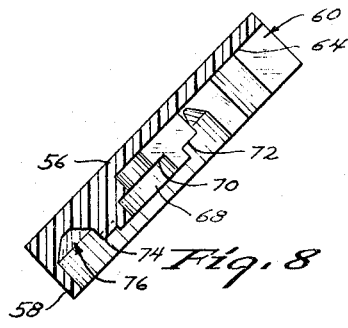
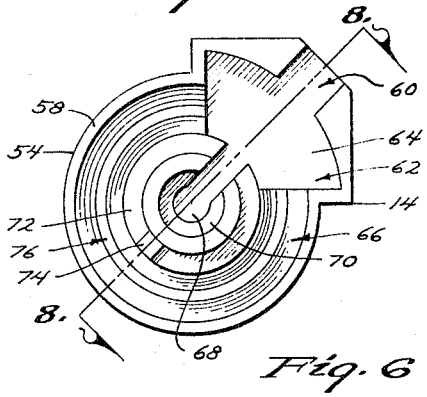
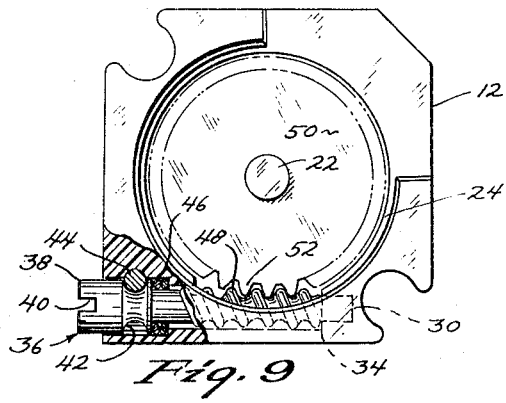
INVENTOR.
MICHAEL C. LAYLAND
BY
Dick, Zarley & Henderson
ATTORNEYS
WITNESS
NORMAN G. TRAVISS

United States Patent Office 3,264,594
Patented August 2, 1966

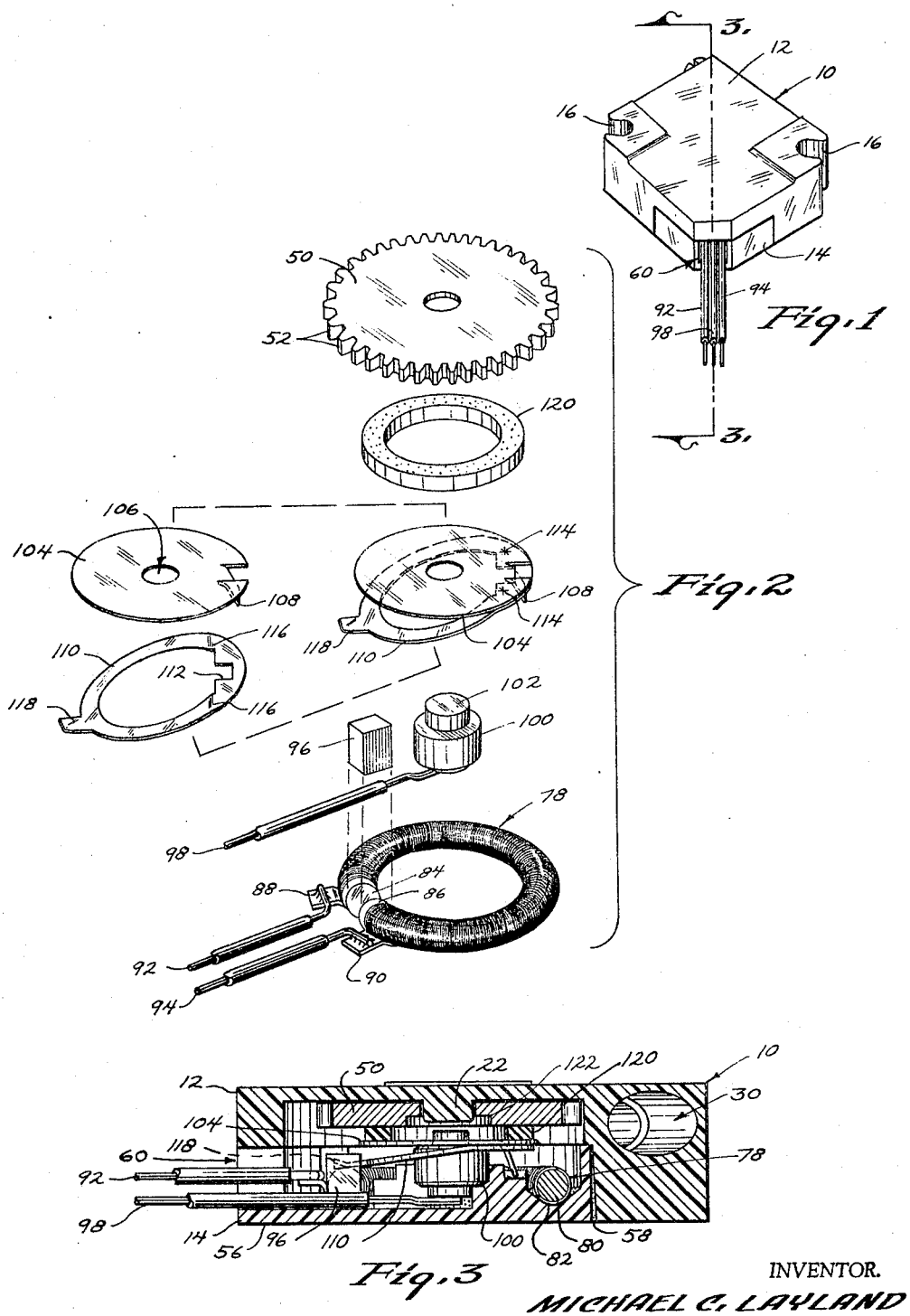

3,264,594
ADJUSTABLE POTENTIOMETER
Michael C. Layland, Columbus, Nebr., assignor to Dale Electronics, Inc., Columbus, Nebr.
Filed Nov. 29, 1962, Ser. No. 240,839
1 Claim. (Cl. 338—174)

Trimmer potentiometers of the type utilizing an arcuate gear element in conjunction with an elongated screw have been extremely useful in specific environments within the electronics field. Among the problems encountered in the fabrication and use of such potentiometers is the damage resulting from adjusting the unit beyond its fixed limits. Excessive temperatures also have had an adverse affect on the units known to me, and the structural characteristics thereof have not been satisfactory. Furthermore, the units known to me have had limitations as to a fine degree of adjustment, and the life of these units has also been limited.

Therefore, a principal object of my invention is to provide an adjustable potentiometer that will not have its parts damaged by adjustment beyond its design capabilities.

A further object of my invention is to provide an adjustable potentiometer that can be closely trimmed to very fine tolerances.

A still further object of my invention is to provide an adjustable potentiometer that will maintain its position of adjustment.

A still further object of my invention is to provide an adjustable potentiometer that has greater mechanical strength.

A still further object of my invention is to provide an adjustable potentiometer that will have a longer operating life.

A still further object of my invention is to provide an adjustable potentiometer that will facilitate the fabrication and assembly thereof in extremely small sizes.

A still further object of my invention is to provide an adjustable potentiometer that will minimize any back lash action of the component parts.

Still further objects of my invention are to provide an adjustable potentiometer that is economical in manufacture, durable in use, and refined in appearance.

These and other objects will be apparent to those skilled in the art.

My invention consists in the construction, arrangements, and combination, of the various parts of the device, whereby the objects contemplated are attained as hereinafter more fully set forth, specifically pointed out in my claim, and illustrated in the accompanying drawing, in which:

FIGURE 1 is a perspective view of my device;

FIGURE 2 is an exploded perspective view of the operational components of my device;

FIGURE 3 is a sectional view of my device taken on line 3—3 of FIGURE 1;

FIGURE 4 is a bottom view of the upper casing;

FIGURE 5 is a sectional view of the upper casing taken on line 5—5 of FIGURE 4;

FIGURE 6 is a plan view of the lower casing;

FIGURE 7 is a side elevational view of the lower casing as viewed from the leadscrew side of the casing;

FIGURE 8 is a sectional view of the lower casing taken on line 8—8 of FIGURE 6; and FIGURE 9 is a bottom plan view of the upper casing with the leadscrew mounted therein and showing its relation to the gear element.

I have used the numeral 10 to generally designate a housing comprised of upper casing 12 and lower casing 14. These casing members are comprised of a molded, non-electro-conducting material such as hard plastic or the like. Upper casing 12 is generally rectangular in shape and has arcuate indentations 16 at its corners to be used in securing the housing to a supporting means. A circular compartment 18 extends upwardly into upper casing 12 and terminates in a flat top portion 20. A circular hub 22 is concentrically positioned with respect to compartment 18 and extends downwardly from the upper portion thereof. As shown in FIGURE 4, a shoulder 24 appears around the lower portion of compartment 18 and terminates in flat portion 26 which is created by the opening 28 in the upper casing 12. The walls of the upper casing extend radially outwardly from the circular walls of compartment 18 to form the sides of opening 28.

An elongated horizontal bore 30 extends into upper casing 12 and is in communication with compartment 18 as shown in FIGURES 4 and 9. Shoulders 32 and 34 appear in bore 30 as its diameter progressively decreases. A leadscrew 36 has its inner end rotatably journaled in the inner end of bore 30 and its head 38 extends outwardly from the bore. A slot 40 in the head of leadscrew 36 facilitates the rotation thereof with a small screwdriver or the like. An arcuate groove 42 extends around the head 38 of leadscrew 36 within bore 30. As shown in FIGURE 9, this groove is semi-circular in cross section. A pin 44 having a diameter substantially equal to the cross sectional diameter of groove 42 is inserted into bore 46 (see FIGURES 4 and 5) which is perpendicularly disposed to bore 30, and which is positioned so that pin 44 can extend upwardly into registering engagement with the leadscrew head 36 at groove 42. Pin 44 thereupon retains leadscrew 36 within bore 30 but permits the leadscrew to rotate within the bore. O-rings 46 are positioned in bore 30 between leadscrew head 38 and shoulder 32 to seal the outer end of the bore 30 from the compartment 18. Threads 48 of the worm gear type are located on the center portion of leadscrew 36 and extend inwardly into the topmost portion of compartment 18 so as not to extend below shoulder 24. A flat, circular metal gear 50 is rotatably mounted on hub 22 and movably engages the top portion 20 of compartment 18. Gear 50 has a plurality of teeth 52 on its outer periphery which mesh with the threads 48 of the leadscrew 36, as will be discussed hereafter.

A plan view of the lower casing 14 is shown in FIGURE 6. The lower casing has an external shape complementary to that of the compartment 18 and opening 28 in upper casing 12. The circular portion 54 of lower casing 14 has a flat external bottom 56 and an upwardly extending circular wall 58. The circular wall 58 terminates and extends radially outwardly at points 60 to be coextensive with the sides of opening 28 in upper casing 12. The top edge of wall 58 is adapted to engage the shoulder 24 and flat portion 26 of upper casing 12 to fix the assembled positions of the two casings. The thickness of lower casing 14 is such that, when assembled in upper casing 12, the bottom 56 of the lower casing will dwell in the same plane as that occupied by the bottom portions of the upper casing 12. This phenomenon is partially illustrated in FIGURE 1. The adjacent coextensive surfaces of the upper and lower casing are slightly tapered to provide a wedge-shaped opening in which a suitable adhesive can be inserted. The adhesive-filled opening 58 in FIGURE 3 illustrates this construction.

A radially extending opening or conduit 60 extends inwardly towards the center of lower casing 14 and is enlarged at its center to form compartment 62. The bottom 64 of the conduit 60 and compartment 62 constitute the lowest surface in the interior of the lower casing 14. The circular portion of wall 58 creates a circular compartment 66 within the lower casing, and the conduit 60 extends to the center of this compartment. A vertical bore 68 extends downwardly into the center of lower casing 14 and terminates in the end of conduit 60. A shoulder 70 appears near the lower end of bore 68 at the point where the diameter of the bore narrows. A concentric shoulder 72 extends around the bore 68 at an elevation slightly below the top of the bore, and a stop element 74 extends upwardly from this shoulder. As shown in FIG-URES 6 and 8, stop element 74 is located immediately opposite and in alignment with conduit 60. A circular groove 76 extends concentrically around bore 68 and shoulder 72. As shown in FIGURE 8, groove 76 is substantially V-shaped in cross section.

A circular resistance coil 78 is comprised of core 80 and windings 82. Coil 78 is mounted in the circular groove 76 of lower casing 14 by any suitable adhesive. The opposite ends 84 and 86 of coil 78 terminate in spaced relation within compartment 62 of the lower casing, and are in alignment with the conduit 60. Terminal connecting elements 88 and 90 are secured to the opposite end portions of coil 78 and insulated leads 92 and 94 are connected to the elements 88 and 90, respectively. These leads 92 and 94 then extend outwardly from the center of the lower casing 12 through the conduit 60. A stop element 96 is secured to the ends 84 and 86 of coil 78 by a suitable adhesive. Stop element 96 extends above the elevation of the coil, and is elevated a sufficient distance above the bottom 64 of conduit 60 to permit a lead wire 98 to extend thereunder.

The inner end of lead wire 98 extends through conduit 60 and is secured to the lower end of bearing or collector element 100 which is journaled on shoulder 70 of bore 68. Bearing element 100 is circular in shape and is of electro-conducting material. A circular hub 102 extends upwardly therefrom and a circular wiper disc 104 is rotatably mounted thereon by virtue of a center aperture 106 which receives hub 102. Disc 104 has a downwardly and outwardly extending flange 108 on its outer perimeter which is formed out of the disc itself. A wiper ring or arm 110 has a notch 112 on its inner periphery. Wiper ring 110 is spot welded to the wiper disc at points 114, and flange 108 of the disc extends downwardly through the notch 112 in ring 110. As shown in FIGURE 2, wiper ring 110 is bent at points 116 so that it extends downwardly at an angle with respect to the wiper disc. A wiping flange 118 extends outwardly from the lower edge of ring 110 and is bent substantially to a V-shape. As shown in FIGURE 3, the flange 118 is adapted to engage the topmost surface of resistance coil 78. When the flange 108 on wiper disc 104 is in engagement with one side of stop element 74 on lower casing 14, the wiping flange 118 will be adjacent the opposite side of stop element 96 which is located between the ends of the resistance coil 78.

A flexible washer 120 is concentrically positioned on wiper disc 104 by any suitable adhesive and extends upwardly into engagement with the bottom of gear 50. The washer 120 is comprised of silicone or the like. It is compressed approximately 0.010 of one inch in its assembled position. It serves as an insulating barrier between the gear and wiper disc, as will be discussed hereafter. The center depression 122 in the bottom of gear 50 (see FIGURE 3) provides clearance for the bearing element 100 and serves to further eliminate the possibility of high voltage breakdown.

The normal operation of my device is as follows: a convenient tool is used in slot 40 of leadscrew 36 to impose rotational motion on the leadscrew. The leadscrew imparts rotational motion to gear 50 by virtue of the intermeshing of leadscrew threads 48 and gear teeth 52. The rotational force on gear 50 overcomes any frictional force occurring between the top inner portion 20 of the upper casing 12 and the top surface of the gear. The frictional engagement between gear 50 and silicone washer 120 causes the washer, and hence the wiper assembly of disc 104 and ring 110, to also rotate. The wiping element 118 on ring 110 is thereupon moved over the top surface of resistance coil 78 so that the resistance in the electrical circuit can be selectively varied in conventional fashion. In this regard, the ring 110, disc 104, bearing 100 and lead 98 include a part of this completed circuit.

The flange on wiper disc 104 engages opposite sides of stop element 74 at the two extreme positions of displacement of the wiper assembly. When flange 108 is in one of these two positions, the wiping flange 118 on the wiper ring is adjacent the opposite side of stop element 96. If the rotation of the collector assembly is not stopped because of the failure of stop element 74, the stop element 96 will then prevail by blocking the rotational path (in one direction) of the wiping flange 118 on wiper ring 110. If the leadscrew 36 is continually rotated after the rotation of the collector assembly has been stopped, the gear 50 will continue to rotate by overcoming its frictional contact with the then stationary washer 120. Thus, the gear teeth 52 or leadscrew threads 48 will not be damaged by this overtravel of the leadscrew. Similarly, the wiper assembly will be protected from damage by any such overtravel.

Since gear 50 is comprised of steel, it can be more easily and more accurately machined. This will provide narrower tolerances of adjustment. In addition, the steel gear 50 is stronger and will be less subject to wear.

The interior of the two casings 12 and 14 are sealed in the manner described by the placing of the O-rings 46 in leadscrew bore 30, and the placing of a suitable adhesive in coextensive adjacent surfaces of the two casings. In addition, a suitable sealing compound is used to seal the outer end of conduit 60 in lower casing 14 after the electrical leads 92, 94 and 98 have been positioned to extend therefrom.

Thus, from the foregoing, it is seen that my device will accomplish at least all of its stated objectives.

Some changes may be made in the construction and arrangement of my adjustable potentiometer without departing from the real spirit and purpose of my invention, and it is my intention to cover by my claim any modified forms of structure or use of mechanical equivalents which may be reasonably included within its scope.

I claim:

In a miniature potentiometer,
a housing,
a compartment in said housing,
an arcuate resistance element in said housing,
an electrical collector element in said housing,
a movable collector assembly movably mounted on said collector element and being in movable electrical contact with said resistance element,
a circular gear means mounted in said housing in substantial spaced relation to said collector assembly and being free from direct engagement with said collector assembly,
a frictional resilient washer element compressed between said gear means and said collector assembly and being only in frictional engagement therewith, said washer element being the only driving means of connection between said gear means and said collector assembly whereby the movement of said gear means will normally induce corresponding movement of said collector assembly and will permit movement of said gear means independently of said collector assembly when said collector assembly is held against movement, said washer element being of such a thickness whereby a substantial reduction of the thickness thereof due to wear thereon will not permit said collector assembly and said gear means to be in direct frictional engagement, said washer means being comprised of electrical insulation material,
and means on the exterior of said housing and operatively connected to said gear means for moving said gear means.

(References on following page)

References Cited by the Examiner

UNITED STATES PATENTS

| | | | |
|---|---|---|---|
| 761,943 | 6/1904 | Brown | 64—30 |
| 1,549,773 | 8/1925 | Hynes | 219—19 |
| 1,676,869 | 7/1928 | Richter | 338—165 X |
| 2,025,831 | 12/1935 | Schellenger | 338—174 |
| 2,069,440 | 2/1937 | Hathorn | 338—170 X |
| 2,346,598 | 4/1944 | Mucher | 338—170 |
| 2,653,459 | 9/1953 | Morrill | 64—30 X |
| 2,822,657 | 2/1958 | Chaffee | 64—30 X |
| 2,871,325 | 1/1959 | Arisman et al. | 338—164 |
| 2,880,293 | 3/1959 | Blanco | 338—164 |
| 2,909,912 | 10/1959 | Loewe et al. | 64—30 |
| 2,989,718 | 6/1961 | Bourns | 338—174 |
| 3,054,077 | 9/1962 | Mellor | 338—175 |
| 3,059,200 | 10/1962 | Bamford | 338—148 X |
| 3,105,949 | 10/1963 | Zarrillo | 338—174 |

RICHARD M. WOOD, *Primary Examiner.*

R. F. STAUBLY, *Assistant Examiner.*